United States Patent [19]

Hockenberger et al.

[11] 4,100,148

[45] Jul. 11, 1978

[54] STORAGE-STABLE, VERY QUICKLY HARDENABLE, ONE-COMPONENT SEALANT BASED ON MERCAPTO-TERMINATED POLYMERS

[75] Inventors: Lothar Hockenberger, Ludwigshafen am Rhein; Manfred Soyka, Duisburg; Gerhard Wilhelm, Viernheim, all of Germany

[73] Assignee: Rütgerswerke Aktiengesellschaft, Frankfurt am Main, Germany

[21] Appl. No.: 683,136

[22] Filed: May 4, 1976

[30] Foreign Application Priority Data

Jun. 13, 1975 [DE] Fed. Rep. of Germany ....... 2526603

[51] Int. Cl.$^2$ ...................... C08G 75/00; C08G 75/04; C09J 3/14
[52] U.S. Cl. .................................. 528/374; 156/327; 156/328; 252/182; 252/316
[58] Field of Search .................. 260/79.7, 79.1, 6; 252/182, 316; 156/327, 328

[56] References Cited

U.S. PATENT DOCUMENTS

| | | | |
|---|---|---|---|
| 2,648,609 | 8/1953 | Wurster | 427/213 |
| 3,117,027 | 1/1960 | Lindlof et al. | 55/2 |
| 3,409,461 | 11/1968 | Mehlo et al. | 117/100 |
| 3,491,046 | 1/1970 | Pachuta | 260/79.1 |
| 3,505,254 | 4/1970 | Kidwell et al. | 260/3 |
| 3,617,585 | 11/1971 | Haas et al. | 264/.5 |
| 3,654,241 | 4/1972 | Doughty et al. | 260/79.1 |
| 3,657,143 | 4/1972 | Crainich | 252/316 |
| 3,748,313 | 7/1973 | Bulbenko et al. | 260/79.1 |
| 3,860,565 | 1/1975 | Barber | 260/77.5 AA |
| 3,925,331 | 12/1975 | Ely | 260/79.1 |
| 4,020,033 | 4/1977 | Dannels | 260/79.1 |

*Primary Examiner*—Ronald W. Griffin
*Attorney, Agent, or Firm*—Beveridge, DeGrandi, Kline & Lunsford

[57] ABSTRACT

A storage-stable, very quickly hardenable, one-component sealant comprises a mercapto-terminated liquid polymer having uniformly distributed therein a curing agent for the polymer, wherein the curing agent is in a micro-encapsulated state.

9 Claims, No Drawings

STORAGE-STABLE, VERY QUICKLY HARDENABLE, ONE-COMPONENT SEALANT BASED ON MERCAPTO-TERMINATED POLYMERS

This invention relates to a one-component sealant composition based on mercapto-terminated polymers.

Mercapto-terminated polymers that can be oxidized with oxidation agents, such as $PbO_2$, $MnO_2$, $ZnO_2$, cumene hydroperoxide, etc., into rubber-like elastic materials are used widely as caulking and sealing materials or as moldable masses.

Those using packing and sealing masses are desirous of using one-component systems as often as possible; i.e., storage-stable mixtures which contain the polymer and the oxidation agent in the same system and which polymerize after use at ambient temperature are referred to as one-component systems. Such systems which harden upon contact with the moisture in air have the disadvantage that their hardening takes several days and at times even several weeks, so that they cannot be used for applications where an early strain on the seal is required.

Two component sealing masses in which the part containing the polymer is mixed with the hardener-containing paste prior to use require one and often even several days for hardening. The processors of such masses need a processing time of at least 30 minutes. In most cases, even a much longer processing time is desired, because whenever such sealing masses are purchased in larger packages, upon use always one container will be provided with hardener and will be mixed ready for use. This mixture now must remain capable of being sprayed until it has been completely used up, whereby a short interruption of the work must also be tolerable. In the manufacture of the sealing mass, this can be achieved by working into the sealing mass substances that delay the polymerization reaction; that is to say, one thus adjusts for a processing time lasting several hours. As a consequence of this, the time for complete hardening is also prolonged, so that the desired rubber-like, that is to say therefore the chargeable seal, will be achieved only after one to three days.

In many cases, such as in the installation of window panes in automobiles, in the production of insulating glass units or in the sealing of expansion joints in a building, it is necessary that the seal be capable of withstanding stresses as early as possible; this cannot be solved satisfactorily with the hitherto used hardening systems.

It is the object of the present invention to provide storage-stable one-component sealing masses, which harden very quickly upon use, and which permit an early stress on the seal produced from the sealing mass.

This is achieved according to the present invention wherein the oxidation agent necessary for the oxidation of the mercapto groups is employed in a micro-encapsulated state; that is to say, the oxidation agent is present in the form of small pellets having a diameter of about 400 to 1600 $\mu$, which are surrounded by an inert wall of a capsule. This wall prevents any reaction between the oxidation agent and the polymer during storage of the mass. When the mass is used, the wall of the capsule can be destroyed by a suitable device. This results in the contents of the capsule being mixed with the polymer surrounding said capsule, and the resulting mass can be moved to the place that is to be sealed. Since no actual processing time is required, one can employ the mixtures of this invention as sealing masses, which are very reactive and which harden in less than one hour.

German OS No. 20, 36, 250 describes a system in which a micro-encapsulated activator, especially water, is added to a mixture consisting of mercapto-terminated polymer and a latent hardener. When the capsule is destroyed, the liberated water activates the oxidation agent, and thus induces the hardening. In comparison with the system of the present invention, this system had the following disadvantages:

The stability of the described capsules is low, especially at elevated temperatures. Therefore, no storage-stable masses can be produced.

The quantity of the added micro-encapsulated activator is small in relation to polymer and hardener; an increase of the quantity of the water serving as activator or of the aqueous solution is limited, since the water is not compatible with the polymer. Consequently, there is an unfavorable distribution ratio of the capsules, and a non-uniform hardening of the mass will result.

In addition, according to the present status of the prior art, one predominantly uses lead dioxide as an oxidation agent for mercapto-terminated polymers despite its toxicity. This is because the lead mercaptides formed during such an oxidation (hardening) reaction improve the elastic characteristics of the sealing mass. The use of lead dioxide in the system according to German OS No. 20, 36, 250 is not possible, but its use is possible in mixtures according to the present invention.

A further advantage of the present invention as compared with the two component $PbO_2$ hardened masses customary hitherto is that, after use, there are no small cans of hardener containing lead oxide residues to reach the environment. The oxidation agents always are either enclosed by the wall of the capsule or by the water insoluble polymer, and are thus non-toxic.

This invention relates to storage-stable, very quickly hardenable sealing masses based on mercapto-terminated polymers, characterized in that the oxidation agents required as hardeners are added in the form of small pellets which are wrapped into a chemically inert, impenetrable, mechanically destroyable wall.

The process of this invention can be applied to all liquid (at room temperature, e.g., 20° – 23° C) polymers or mixtures of monomers, oligomers and polymer compounds having terminal mercapto groups, such as polysulfide polymers, thioether polymers, etc. Typical compounds are commercially available under the tradename THIOKOL LIQUID POLYMERS from The Thiokol Corporation of Trenton, N.J.

Inorganic dioxides, peroxides, or other compounds of heavy metals with a high valency, or organic hydroperoxides can be employed as oxidation agents, with which it is known that the SH-groups oxidize to form disulfide bonds; for example, lead dioxide, manganese dioxide, hydrogen peroxide, chromate, cumene hydroperoxide and others can be employed. The latent hardeners, such as calcium peroxide, barium peroxide, zinc peroxide and others, can also be employed in this invention whenever an activator is mixed into the mass.

The oxidation agents are made into a paste, effectively in a softener (plasticizer) compatible with the polymer, and are then provided with a mechanically destroyable wall forming a capsule according to processes well known in the art. The wall of the capsule must be insoluble in the polymer employed as well as insoluble in the softener, and it must withstand slight mechanical stresses without breaking.

For example, during the stirring in of the capsules into the polymer, the wall of the capsule must not break, and the finished mixture must be capable of being pumped without at the same time destroying the capsules of the hardener. The sizes of the capsules are within the range of about 100 to about 2000 μ, preferably in the range of about 600 to about 1000 μ. It is difficult to destroy capsules that are too small, while capsules that are too large cause an unfavorable degree of distribution of the hardener in the mass.

The quantity of the added capsules is derived from the quantity of the oxidation agent required. In any case, it must be assured that all SH groups of the polymers will be oxidized; that is to say, one must add at least the quantity of oxidtion agent equivalent to the SH content. Preferably, one should calculate the amount of oxidation agent to provide an excess of about 10 to 20 weight percent. If one adds to that the quantities of the softener necessary for the production of the paste and the quantities of the wall materials for the capsules, then the quantity of the capsules to be used can be calculated.

The capsules containing the hardener are mixed into the mercapto-terminated polymer or into mixtures of the mercapto-terminated polymer with softeners (i.e., plasticizers), such as phthalates or chlorinated hydrocarbons, as well as pigments, fillers, thixotropic agents or accelerators, such as calcium carbonate, clay, titanium dioxide, soot, sulfur, tertiary amines, and others. Effectively, this is accomplished in a slowly running planetary-type mixer, whereby the capsules will be distributed evenly after 1–2 minutes.

The mixture obtained in this way can be filled into containers or cartridges, and is storage-stable even in the event of the admission of moisture or at higher temperatures, as long as the capsules are not destroyed mechanically by pressure or friction. When the mass is used, the walls of the capsules must be destroyed by a mechanical device, whereby the oxidation agent is mixed with the mercapto-terminated polymer and the hardening begins.

This invention will be explained in more detail by the following examples. All parts, proportions, ratios and percentages are by weight unless otherwise indicated.

The polymer employed in the Examples 1–3 is a polysulfide having an average structure

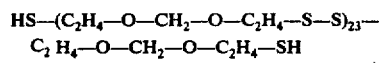

with about 0.5% of cross-linking. It has an average molecular weight of 4000 and a viscosity of about 350–450 poises at 27° C. This polymer is commercially available from The Thiokol Corporation.

All quantitative data refer to parts by weight or percent by weight.

EXAMPLE 1

| A mixture consisting of | |
|---|---|
| polysulfide polymer | 1000 |
| plasticizer (benzylbutyl phthalate) | 450 |
| chalk | 350 |
| clay | 150 |
| titanium dioxide | 300 |
| sulfur | 2 |
| thixotroping agent (Aerosil; a finely divided SiO$_2$) | 40 | was mixed for 2 minutes at a speed of 10 rpm in a planetary-type mixer with 200 g of microcapsules.

The capsules consisted of a paste of lead dioxide/plasticizer in 1 : 1 ratio surrounded by a wall of gelatin in a ratio of paste : wall material of 12 : 1. The diameter of the capsules was 800 μ.

During the mixing process and during the subsequent filling of the mass into cartridges, no capsules were destroyed. During the storage time of 12 months at standard climate 23/50, no increase of the viscosity of the mass was observed; i.e., the mass is storage-stable for at least 12 months.

A part of the mass was sprayed out immediately after production with the help of a spray gun, which had a conveying worm and a chopper behind the spray nozzle. At the same time, the capsules were destroyed. The original white mass was colored a uniform brown. After two hours, it had hardened into a non-adhesive, rubber-like elastic material. An analogous dispensing process was carried out after the mass had been stored for 12 months. In this case too, the dispensed mixture hardened after two hours.

EXAMPLE 2

2300 g of the basic mixture described in Example 1 were mixed for 2 minutes at a speed of 10 rpm in a planetary-type mixer with 200 g of microcapsules.

The capsules contained a paste of lead dioxide/plasticizer in 1 : 1 ratio. The size of the capsules was in the range of 100–1600 μ.

During the mixing process and during the subsequent filling of the mass into cartridges, a few of the large capsules were destroyed, so that a slight increase of the viscosity of the mass was observed; however, the processability of the mass was still perfect, even after a storage time of 12 months.

A part of the mass was dispensed with the device described in Example 1. The dispensed material was uniformly brown, but one could see small undestroyed capsules. The hardening time was two hours.

EXAMPLE 3

2000 g of the basic mixture described in Example 1 were mixed for two minutes at a speed of 10 rpm in a planetary-type mixer with 120 g of microcapsules and 3 g of triethanolamine.

The capsules consisted of cumene hydroperoxide, which was surrounded by a wall of gelatin in a ratio of 12 : 1. The size of the capsules was in the range of 400–1000 μ.

During the mixing process and during the filling of the mass, no destruction of the capsules was observed. After a storage time of 12 months, the processability was still good.

A part of the mass was dispensed with the device described in Example 1. The hardening time was 8 hours.

EXAMPLE 4

The polymer used in this example is a polymercaptan of the average structure

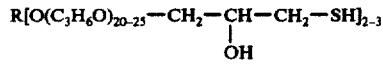

where R signifies an aliphatic radical. The polymer had an average molecular weight of 6000 and a viscosity of 60 poises at about 25° C. It is commercially available from The Thiokol Corporation.

1000 g of this polymer were employed in the mixture described in Example 1 instead of the polysulfide polymer.

2000 g of the resulting mixture were mixed with 200 g of microcapsules which contained lead dioxide. The mass was storage-stable for more than 12 months, and after dispensing analogously to Examples 1-3, the mass hardened after 50 minutes.

What is claimed is:

1. A storage-stable sealant composition capable of quickly hardening, said composition comprising at least one liquid monomer, oligomer or polymer having terminal mercapto groups; and at least one oxidation agent for curing said liquid monomer, oligomer or polymer; wherein said oxidation agent is substantially uniformly distributed throughout said composition in the form of encapsulated small particles of a paste made from said oxidation agent and a plasticizer which is compatible with said liquid monomer, oligomer or polymer wrapped in a gelatin encapsulating material, the ratio of paste to gelatin being 12:1.

2. Composition according to claim 1 wherein said particles of said oxidation agent have a size within the range of about 100 to about 2000 $\mu$.

3. Composition according to claim 1 wherein said particles of said oxidation agent have a size within the range of about 600 to about 1000 $\mu$.

4. Composition according to claim 1 wherein said liquid polymer is a polysulfide polymer or a thioether polymer.

5. Composition according to claim 1 wherein each particle is in the form of a capsule having a wall which is insoluble in said liquid monomer, oligomer or polymer.

6. Composition according to claim 1 wherein said oxidation agent is present in about 10 to about 20 weight percent stoichiometric excess relative to the SH-content of said liquid monomer, oligomer or polymer.

7. Composition according to claim 1 wherein said oxidation agent is lead dioxide.

8. Composition according to claim 1 wherein each of said particles comprises lead dioxide and plasticizer.

9. Composition according to claim 1 wherein said oxidation agent is lead dioxide or manganese dioxide.

* * * * *